United States Patent Office 3,480,618
Patented Nov. 25, 1969

3,480,618
17-OXYGENATED 3-ALKOXY-2-AMINOSULFONYL-ESTRA-1,3,5(10)-TRIENES AND CONGENERS
Arthur H. Goldkamp, Winnetka, Ill., assignor to G. D. Searle & Co., Chicago, Ill., a corporation of Delaware
No Drawing. Filed Jan. 19, 1968, Ser. No. 699,040
Int. Cl. C07c *173/00, 169/00*
U.S. Cl. 260—239.5      7 Claims

ABSTRACT OF THE DISCLOSURE

The preparation of the captioned compounds—for example, 17β - acetoxy - 3-methoxy-2-sulfamoylestra-1,3-5(10)-triene—and their valuable surfactant properties are disclosed.

---

This invention relates to 17-oxygenated 3-alkoxy-2-aminosulfonylestra-1,3,5(10)-trienes and congeners, and to processes for the preparation thereof. More particularly, this invention provides new, useful, and unobvious chemical compounds of the formula:

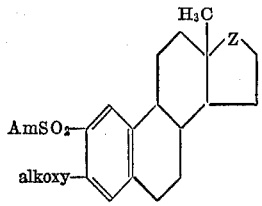

wherein Am represents an optionally-alkylated amino radical and Z represents a carbonyl, β-hydroxymethylene, β-alkanoyloxymethylene, or α-ethynyl-β-hydroxymethylene radical. Alternatively, Am represents hydroxyl or a radical of the formula, $NH_4O$—.

Am in the foregoing generic formula for compounds of this invention subsumes both the primary amino radical, —$NH_2$, and secondary and tertiary amino radicals which may be thought of as derived from the primary amino grouping by replacement of hydrogen with 1 or 2 alkyl radicals. Especially adapted to such replacement are lower alkyl radicals, which is to say monovalent, saturated, acyclic, straight- or branched-chain hydrocarbon groupings of empirical formula —$C_nH_{2n+1}$ wherein $n$ represents a positive integer less than 8. Typical lower alkyl radicals include methyl, ethyl, propyl, isopropyl, butyl, isobutyl, sec-butyl, tert-butyl, pentyl, neopentyl, hexyl, isohexyl, heptyl, etc.

The alkyl groupings present when Am designates a tertiary amino radical may either be discrete, thus

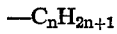

or they may be joined together directly or through oxygen or a second nitrogen atom to compose cyclic amino radicals optimally but not necessarily exclusively comprising at least 4 and as many as 6 carbon atoms. Somewhat more broadly representative of the cyclic amino radicals contemplated by Am are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- and 6-membered heterocyclic groupings. The terminal "ino" in the radical names set forth denotes attachment of the radicals thus characterized via nitrogen.

Those skilled in the art will recognize that the alkoxy substituent called for by the generic formula for compounds of this invention has the formula alkyl—O— and the β-alkanoyloxymethylene radicals represented by Z therein have the formula

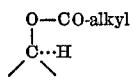

In each instance, lower alkyl groupings are preferred.

The compounds to which this invention relates are useful by reason of their valuable surfactant properties. Incorporated in mixtures of insoluble liquids and/or solids, they promote wetting, dispersion, foaming, frothing, emulsification, and the like. A typical mixture of this type, having improved water absorption and excellent emollient characteristics adapted to multiple applications in pharmacy and cosmetology either per se or as a carrier for known medicaments, comprises 85% white petrolatum, 10% stearyl alcohol, and 5% compound, melted together and then chilled until congealed during continuous agitation.

Preparation of the subject compounds proceeds by contacting an appropriate 17β-alkanoyloxy-3-alkoxy-estra-1,3,5(10)-triene or corresponding 17-one with a large excess of chlorosulfonic acid, using chloroform as a solvent if desired and maintaining temperatures of the order of 10° C. The resultant 2-chlorosulfonyl compound is contacted at room temperatures with an appropriate amine of the formula Am'H wherein Am' has the meaning previously assigned to Am excepting that Am' represents neither hydroxyl nor the radical $NH_4O$—

Tetrahydrofuran ordinarily serves as the reaction medium. The instant 2-aminosulfonyl compound, if there be a 17β-alkanoyloxy group therein, is saponified with aqueous methanolic potassium hydroxide in tetrahydrofuran; and the 17β-hydroxy group which eventuates is oxidized with aqueous acetonic chromium trioxide in tetrahydrofuran at 10° C. to produce the corresponding 17-one. From the 17-ones hereof, on contact with lithium acetylide-ethylenediamine complex in tetrahydrofuran at 10° C., the corresponding 17α-ethynyl-17β-ols mature. Restricting to 1 or 2 equivalents the amount of chlorosulfonic acid used in the reaction of a 17β-alkanoyloxy-3-alkoxy-estra-1,3,5(10)-triene or corresponding 17-one—particularly where an aromatic solvent such as benzene is employed—affords, on basifying with ammonium hydroxide, a corresponding ammonium sulfonate hereof (Am=$NH_4O$—)

The latter compound, on acidification with hydrochloric acid, yields the corresponding acid (Am=HO—).

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials are in parts by weight, except as otherwise noted.

EXAMPLE 1

(A) 17β-acetoxy-2-chlorosulfonyl-3-methoxyestra-1,3,5(10)-triene

Approximately 335 parts of chloroform is washed with water and dried over anhydrous sodium sulfate, whereupon 45 parts of 17β-acetoxy - 3 - methoxyestra - 1,3,5 (10)-triene is dissolved therein. The resultant solution is maintained at about 10° with moderate stirring while 315 parts of chlorosulfonic acid is introduced during 70 minutes. The solution thus obtained is cautiously poured into 3 volumes of ice-and-water. The resultant mixture is extracted with carbon tetrachloride. The extract is dried over anhydrous sodium sulfate, whereupon the solvent is removed by vaccum distillation and the residue then recrystallized from a mixture of benzene and petroleum ether. The crystalline product is 17β - acetoxy - 2 - chlorosulfonyl - 3 - methoxyestra - 1,3,5(10) - triene melting at 196–199°.

(B) 17β-acetoxy-3-methoxy-2-sulfamoylestra-1,3,5(10)-triene

Ammonia is bubbled into 270 parts of tetrahydrofuran at room temperatures while a solution of approximately 7 parts of 17β - acetoxy - 2 - chlorosulfonyl - 3 - methoxy-estra-1,3,5(10)-triene in 180 parts of tetrahydrofuran is mixed therewith during 10–15 minutes. The mixture is stirred and introduction of ammonia is continued for 3½ hours, at which point the mixture is diluted with approximately 2 volumes of water and then chilled. The precipitate which forms is filtered out and dried in air. The product thus isolated is 17β - acetoxy - 3 - methoxy-2-sulfamoylestra-1,3,5(10)-triene melting at 273–276.5°. It has the formula

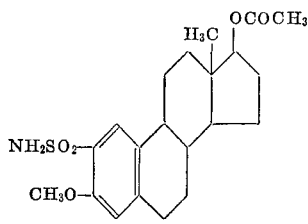

EXAMPLE 2

3-methyl-2-sulfamoylestra-1,3,5(10)-trien-17β-ol

A solution of 3 parts of 17β-acetoxy-3-methoxy-3-sulfamoylestra-1,3,5(10)-triene in 450 parts of tetrahydrofuran is heated with a solution of 48 parts of potassium hydroxide in 800 parts of ethanol and 400 parts of water for 1½ hours at around 90° Sufficient ice is then introduced to cool the resultant mixture, which is thereupon mixed with decolorizing charcoal and filtered. The filtrate is acidified with 10% sulfuric acid and then diluted with 3 volumes of water. The mixture thus obtained is heated for approximately 10 minutes at around 90°, then chilled. Insoluble solids are thereupon filtered off, dried in air, and recrystallized from methanol to give 3-methoxy-2-sulfamoylestra-1,3,5(10)-trien-17β-ol melting at 293–296°. The product has the formula

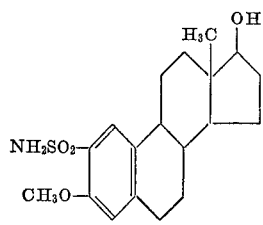

EXAMPLE 3

3-methoxy-3-sulfomoylestra-1,3,5(10)-trien-17-one

To a suspension of 586 parts of 3-methoxy-2- sulfamoyl-estra-1,3,5(10)-trien-17β-ol in 8900 parts of tetrahydrofuran at around 10° is consecutively added, with stirring, 15,800 parts of acetone and a solution of 120 parts of chromium trioxide in a mixture of 178 parts of sulfuric acid with 365 parts of water. The resultant mixture is poured into 3 volumes of ice-and-water. Insoluble solids are filtered off and dried in air. The product thus isolated is 3-methoxy-2-sulfamoylestra - 1,3,5(10) - trien-17-one melting at 254.5–259.5°. The product has the formula

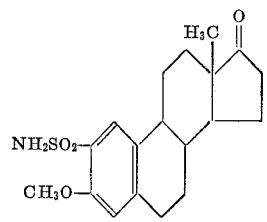

EXAMPLE 4

17α-ethynyl-3-methoxy-2-sulfamoylestra-1,3,5(10)-trien-17β-ol

To a stirred suspension of 120 parts of lithium acetylide-ethylenediamine complex in 450 parts of tetrahydrofuran at 5–10° under an atmosphere of nitrogen is slowly (during 50 minutes) added a solution of 46 parts of 3-methoxy - 2 - sulfamoylestra - 1,3,5(10) - trien - 17 - one in 9000 parts of tetrahydrofuran. Stirring under nitrogen at 5–10° is continued for 5½ hours, at which point 500 parts of water followed by sufficient sulfuric acid to induce acidification is cautiously mixed in. An oil separates. The pH is readjusted to approximately 8 with aqueous 10% sodium bicarbonate, whereupon the mixture is cooled overnight. The oil solidifies. The solid is separated by filtration and chromatographed on silica gel, using benzene and ethyl acetate as developing solvents. From an eluate comprising 20% ethyl acetate in benzene, on evaporation of solvent, there is obtained a residue which is taken up in a minimal amount of warm 2-propanol. To the propanol solution is added 200 parts of ethanol, 105 parts acetic acid, and 10 parts of (carboxymethyl)trimethylammonium chloride hydrazide (Girard's Reagent T). The resultant mixture is heated at the boiling point for 1 hour, then mixed with an equal volume of ice-and-water. Insoluble solids are filtered off, recrystallized from 2-propanol, washed with ether, and dried in air to give 17α - ethynyl - 3 - methoxy - 2 - sulfamoylestra - 1,3,5 (10)-trien-17β-ol melting in the range 219–228°. The product has the formula

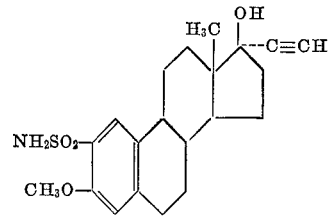

EXAMPLE 5

(A) 2-chlorosulfonyl-3-methoxyestra-1,3,5(10)-trien-17-one

To 51 parts of chlorosulfonic acid at 5–10° is added, portionwise with stirring during 5 minutes, 10 parts of 3 - methoxyestra - 1,3,5(10) - trien - 17 - one. The resultant mixture is poured into 3 volumes of ice-and-water. Insoluble solids are filtered off, dried in air, and extracted by trituration with chloroform. The chloroform extract is filtered; and the filtrate is consecutively washed with aqueous 10% sodium bicarbonate and water, dried in air, and stripped of solvents by vacuum distillation. The residue is 2 - chlorosulfonyl - 3 - methoxyestra - 1,3,5(10) trien-17-one.

(B) 3-methoxy-2-dimethylsulfamoylestra-1,3,5(10)-trien-17-one

Approximately 5 parts of 2-chlorosulfonyl-3-methoxyestra-1,3,5(10)-trien-17-one is mixed by trituration with approximately 50 parts of aqueous 25% dimethylamine. Water is removed by vacuum distillation, and the residue is taken up in chloroform. The chloroform extract is consecutively washed with aqueous 5% potassium hydroxide and water, dried over anhydrous sodium sulfate, and freed of solvent by vacuum distillation. Recrystallization of the residue from ethanol affords 3-methoxy-2-dimethylsulfamoylestra - 1,3,5(10) - trien - 17 - one melting at 189–194.5° C. The product has the formula

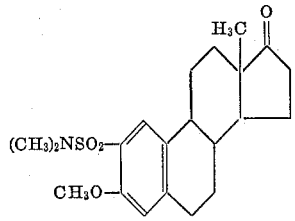

EXAMPLE 6

17β-acetoxy-3-methoxy-2-piperidinosulfonylestra-1,3,5(10)-triene

A solution of 7 parts of 17β-acetoxy-2-chlorosulfonyl-3-methoxyestra-1,3,5(10)-triene in 90 parts of tetrahydrofuran and 17 parts of piperidine is allowed to stand at room temperatures for 3 hours, then diluted slowly with 5 volumes of water. Insoluble solids are filtered off, dried in air, and consecutively recrystallized from methanol and a mixture of dichloromethane and methanol to give 17β-acetoxy - 3 - methoxy - 2 - piperidinosulfonylestra - 1,3,5 (10)-triene melting at 206.5–209.5°. The product has the formula

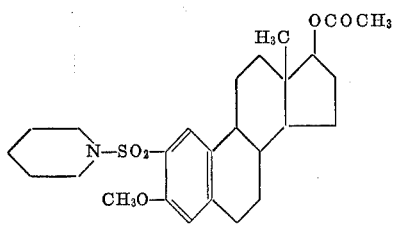

EXAMPLE 7

Ammonium 3-methoxy-17-oxoestra-1,3,5(10)-trien-2-ylsulfonate

An anhydrous solution of 3-methoxyestra-1,3,5(10)-trien-17-one in 72 parts of benzene is stirred and chilled until incipient precipitation is manifest, at which point 15 parts of chlorosulfonic acid is mixed in during 10 minutes. Precipitation occurs. Stirring is continued for 30 minutes, whereupon the mixture is poured into 216 parts of concentrated aqueous ammonium hydroxide. Solvent is removed by vacuum distillation. The residue is washed by successively triturating with water and chloroform, then dried in air to give ammonium 3-methoxy-17-oxoestra - 1,3,5(10) - trien - 2 - ylsulfonate melting at >280° (with decomposition). The product has the formula.

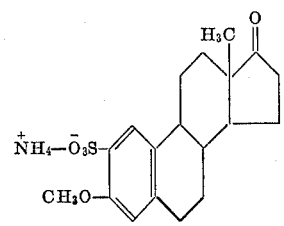

EXAMPLE 8

3-methoxy-17-oxoestra-1,3,5(10)-triene-2-sulfonic acid

A solution of 3 parts of ammonium 3-methoxy-17-oxoestra-1,3,5(10)-trien-2-ylsulfonate in 100 parts of water is mixed with decolorizing charcoal. The mixture is filtered. To the filtrate is added approximately 24 parts of concentrated hydrochloric acid. Sufficient ice is thereupon added to induce chilling, at which point insoluble solids are filtered off, dried in air, and recrystallized from water to give 3-methoxy-17-oxoestra-1,3,5(10)-triene-2-sulfonic acid as a hydrate melting at approximately 236–237° (with decomposition to a green melt). The anhydrous product has the formula

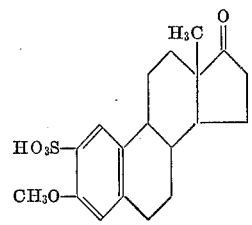

What is claimed is:
1. A compound of the formula

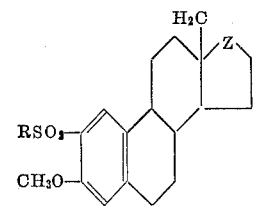

wherein R represents amino, di(lower alkyl)amino, pyrrolidino, piperidino, hydroxy, or a radical of the formula $NH_4O-$ and Z represents carbonyl, β-hydroxymethylene, β-(lower alkanoyl)oxymethylene, or α - ethynyl - β - hydroxymethylene.

2. A compound according to claim 1 which is 17β-acetoxy-3-methoxy-2-sulfamoylestra-1,3,5(10)-triene.
3. A compound according to claim 1 which is 3-methoxy-2-sulfamoylestra-1,3,5(10)-trien-17-one.
4. A compound according to claim 1 which is 3-methoxy-2-dimethylsulamoylestra-1,3,5-10)-trien-17-one.
5. A compound according to claim 1 which is 17β- acetoxy - 3 - methoxy - 2 - piperidinosulfonylesta - 1,3,5(10)-triene.
6. A compound according to claim 1 which is ammonium 3 - methoxy - 17 - oxoestra - 1,3,5(10) - trien - 2-ylsulfonate.
7. A compound of the formula

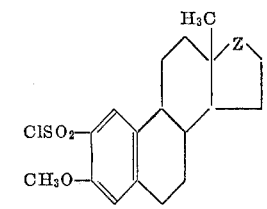

wherein Z represents carbonyl or β-(lower alkanoyl)-oxymethylene.

No references cited.

HENRY A. FRENCH, Primary Examiner

U.S. Cl. X.R.

260—397.4, 397.5, 999

PO-1050
(5/69)

UNITED STATES PATENT OFFICE
CERTIFICATE OF CORRECTION

Patent No. 3,480,618    Dated November 25, 1969

Inventor(s)    Arthur H. Goldkamp

It is certified that error appears in the above-identified patent and that said Letters Patent are hereby corrected as shown below:

Column 3, line 45, "3-methyl" should be -- 3-methoxy --.

Column 3, line 47, "3-methoxy-3-sulfamoylestra" should be -- 3-methoxy-2-sulfamoylestra --.

Column 6, line 49, "2-piperidinosulfonylesta" should be -- 2-piperidinosulfonylestra --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents